United States Patent Office 2,783,179
Patented Feb. 26, 1957

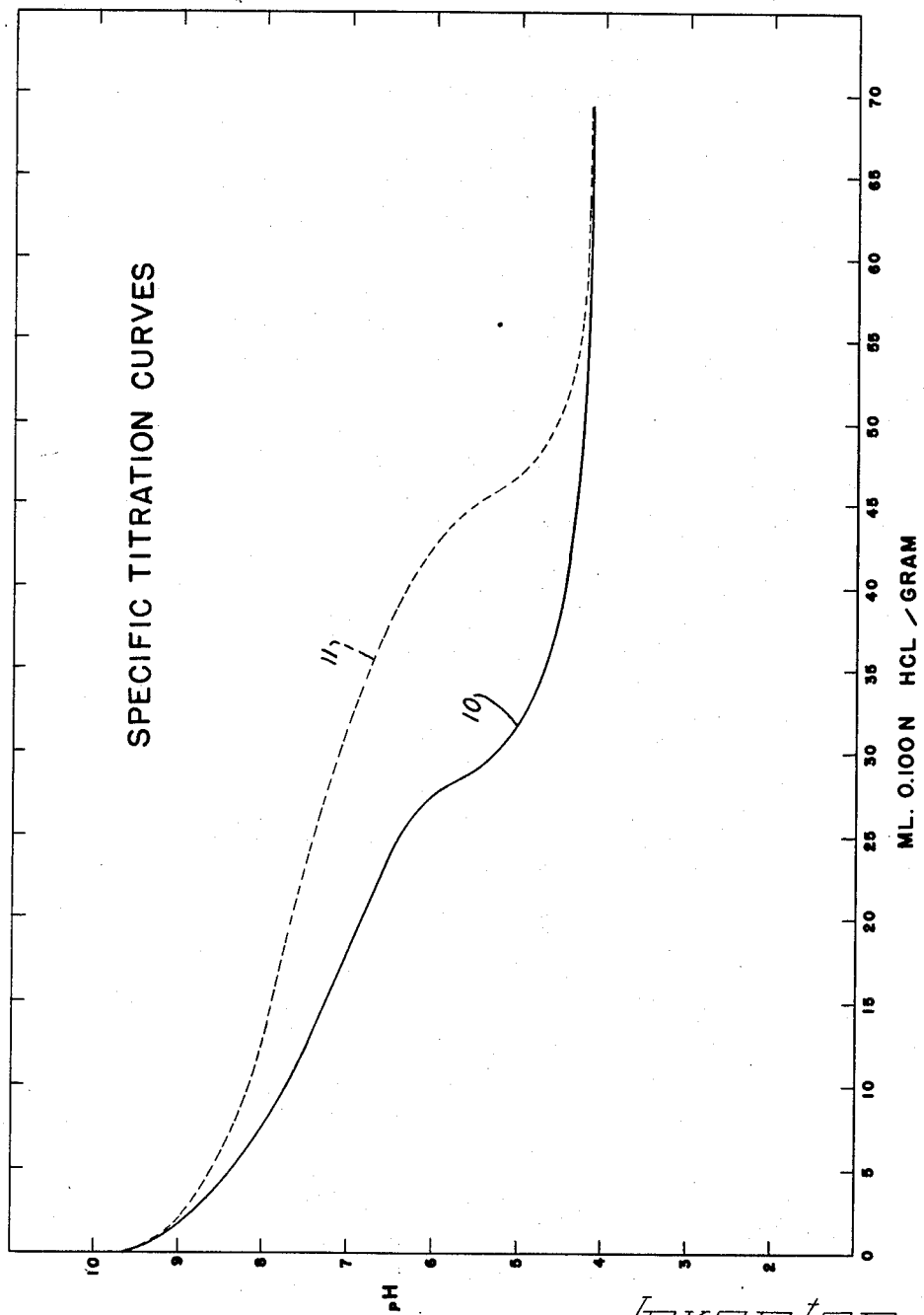

2,783,179

ISOMERIC ALUMINUM HYDROXY CARBONATES AS ANTACIDS

Irvine W. Grote, Chattanooga, Tenn., assignor to Chattanooga Medicine Company, Chattanooga, Tenn., a corporation of Tennessee Application October 21, 1955, Serial No. 541,938

6 Claims. (Cl. 167—72)

This invention relates to an antacid and method of administering the same, and more particularly to an essentially non-systemic antacid composition consisting essentially of an aluminum complex having the generic formula hereinafter given, and to the method of combating gastric hyperacidity by its oral administration to humans.

The compounds used as antacids in accordance with my present invention are dihydroxy aluminum sodium carbonate and its isomer

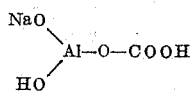

hydroxy sodoxy aluminum hydrogen carbonate. These compounds have the generic formula—

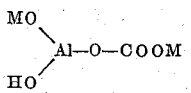

wherein either M is sodium and the other is hydrogen. Dihydroxy aluminum sodium carbonate has the formula:

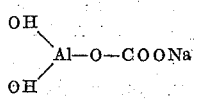

I have found that these isomeric compounds can be satisfactorily used to counteract gastric hyperacidity. In accordance with accepted methods of classifying antacids, these compounds may properly be classified as essentially non-systemic antacids. A systemic antacid is one that is soluble in the gastro-intestinal tract, readily absorbed from the tract and capable of changing the pH of the extracellular fluid and thus producing alkalosis. Serious distortion of the acid-base balance of the body may result from the introduction of substances into the gastro-intestinal tract which are potentially acid or basic. The non-systemic antacids are poorly absorbed, hence, these compounds have little direct effect on the acid-base equilibrium of the blood and are, therefore, not prone to cause alkalosis.

Serious distortion of the acid-base balance of the body may result from the introduction of substances into the gastro-intestinal tract which are potentially acid or basic. If a systemic antacid, such as sodium bicarbonate, is taken by mouth, the hydrochloric acid of the gastric juice is neutralized in the stomach and sodium chloride and carbon dioxide are formed. Any excess of sodium bicarbonate above that required to neutralize the acid remains unchanged and is reabsorbed as such along with the sodium chloride. Up to the period of reabsorption, the changes that occur in the blood are an increase in the concentration of the bicarbonate of the blood due to the secretion of hydrochloric acid, and this, in turn, is reduced by the secretory activity of the liver and pancreas. Consequently, the absorption of the intestinal contents containing unneutralized bicarbonate causes a further increase in the bicarbonate concentration of the blood and a rise in the pH. The kidney must then excrete the excess bicarbonate in order to restore the normal chemistry of the blood fluids and thus the urine becomes alkaline. Failure of the renal mechanism to function adequately would result in alkalosis.

Non-systemic antacids also neutralize the gastric contents, but do not tend to cause systemic alkalosis. The isomeric compounds above named are essentially non-systemic antacids. They are efficient in neutralizing gastric juices and yet do not cause systemic alkalosis. The compounds of the present invention do not cause acid rebound even when given in excessive dosages; they interfere less with the digestive process; they do not cause diarrhea or constipation; they do not irritate the stomach; are insoluble in water; relieve pain, and will produce an eructation.

It is therefore preferable in preparing antacid compositions containing either or both of these isomeric compounds to exclude from the composition any substantial proportion of such systemic antacids as free sodium bicarbonate. The isomeric compounds are therefore preferably prepared in a substantially pure state, free from any substantial proportion of the sodium bicarbonate that is used as a reactant in their preparation. Suitable methods for accomplishing this will be described hereinafter.

It is therefore an important object of this invention to provide an essentially non-systemic antacid having novel and improved properties particularly adapting it for use in combating gastric hyperacidity.

Other and further important objects of my invention will become apparent from the following description and appended claims.

The drawing shows a specific titration chart for dihydroxy aluminum sodium carbonate and its isomer.

Since different methods are used in the preparation of dihydroxy aluminum sodium carbonate and the isomeric form thereof above referred to, these methods will be described separately.

*Method of preparing dihydroxy aluminum sodium carbonate*

Dihydroxy aluminum sodium carbonate is preferably prepared by the reaction between an aluminum alkoxide and sodium bicarbonate in an aqueous medium. The preferred alkoxide is aluminum iso-propylate (tri-isopropoxide), but other aluminum tri-alkoxides may be used, including aluminum ethylate, tertiary butylate and the like wherein the alkoxide groups are $C_2$–$C_4$ groups. As is well known, these aluminum tri-alkoxides, although relatively water insoluble, hydrolyze in a basic aqueous medium to form an aluminum hydroxide compound, that is, a compound containing at least two hydroxyl groups and either a third hydroxyl group or an alkoxide group.

The reactant that is preferably used with the aluminum tri-alkoxide is sodium bicarbonate. This may be formed in situ in the aqueous medium by the use of sodium carbonate and carbon dioxide, but is preferably added as such. The reaction involved may be represented as follows:

(1) 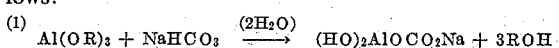

wherein R is a $C_2$–$C_4$ alkyl group.

As a specific example, the following is given:

EXAMPLE I

Sodium bicarbonate (168 gms., 2 moles) was dissolved in 1400 cc. of water in a 2 liter stainless steel beaker. The solution temperature was adjusted to between 45 and 50° C. Liquid aluminum isopropylate (ca. 408 gms., 2 moles) was added rapidly to the sodium bicarbonate solution in the beaker, with violent agitation. The usual addition time was about 1½ minutes. A stainless steel turbine type agitator was used and run at high speed. The slurry was stirred for ten minutes and allowed to stand over night. It was then filtered and the filter cake dried to a moisture content of between 10 and 12%.

The following analytical results show a comparison between the percentages calculated for the various components of dihydroxy aluminum sodium carbonate of the formula above given, and the percentages actually found by analysis:

ANALYTICAL RESULTS ON DIHYDROXY ALUMINUM SODIUM CARBONATE OF EXAMPLE I

|  | Calculated | Found |
| --- | --- | --- |
| $Al_2O_3$ | 35.40 | 36.8 |
| $CO_2$ | 30.56 | 29.59 |
| $H_2$ | 1.40 | 1.48 |
| Residue on ignition | 59.69 | 58.27 |
| Na | 15.97 | 16.2 |
| Molecular weight | 144.00 | |

| | |
| --- | --- |
| Moisture _____percent__ | 11.0 |
| pH water suspension _____ | 9.70 |
| Acid consuming power _____cc./gm__ | 230 |
| Density _____gms./cc__ | 2.144 |

The moisture determination was made by heating dihydroxy aluminum sodium carbonate at 110° C. in vacuo over phosphorus pentoxide for two hours and determining the loss in weight.

The pH of the water suspension of the compound was taken as the pH of a slurry of 1 gram of the finely powdered material in 25 ml. of distilled water.

The acid consuming power of the compound was determined by adding 0.25 gm. of the finely powdered material to 75 ml. of 0.1-n hydrochloric acid. The solution was gently agitated for ten minutes and then back titrated with 0.1-N sodium hydroxide to a pH of 3.8. The acid consuming power is expressed as the ml. of 0.100-N hydrochloric acid consumed by a gram of the sample.

In order to determine its neutralization characteristics, 30 mgs. of the compound of Example I were added to 20 ml. of 0.01-N hydrochloric acid and the pH change recorded with time. In this determination, the Fisher titrimeter was used with calomel and glass electrodes for pH determinations. The eye control was set using a buffer solution of pH 3 made by mixing 0.1 molar citric acid solution with 0.2 molar disodium phosphate solution in the proportion of 15.89 ml. to 4.11 ml. according to McIlvaines Standard Buffer Solution directions. The pH readings at 23° C. were as follows:

| Time in minutes | 1[1] | 2[1] |
| --- | --- | --- |
| 0 | 1.61 | 1.40 |
| 2 | 2.32 | 2.00 |
| 4 | 3.10 | 2.95 |
| 5 | 3.30 | 3.12 |
| 8 | | 3.30 |
| 10 | 3.30 | 3.30 |
| 15 | 3.30 | 3.31 |
| 20 | 3.30 | 3.33 |
| 25 | 3.30 | 3.32 |
| 30 | 3.30 | 3.31 |

[1] Specimens 1 and 2 were specimens of dihydroxy aluminum sodium carbonate prepared in accordance with the method of Example I.

It will be seen from the foregoing that under the conditions of the neutralization determination above set forth, the pH value rises to a pH of at least 3 within five minutes of the beginning of the test period and shortly thereafter reaches and stays at a pH of about 3.30 for the balance of the thirty minute test period.

Dihydroxy aluminum sodium carbonate, prepared as above described, is substantially amorphous, or at least is a very poorly crystallized substance. When tested for index of refraction using the immersion method, the compound is found to have only one aggregate index of refraction, which was somewhere between 1.488 and 1.509. The reason for this broad index of refraction range is that the index of the same specimen varies when tested at different times.

The specific acid titration curve for dihydroxy aluminum sodium carbonate is illustrated in the drawing by the solid line curve indicated by the reference numeral 10. The procedure for the specific acid titration is as follows:

The reagent used is hydrochloric acid which has been adjusted as nearly as possible to a normality of 0.10 and accurately standarized. In the preparation of the sample, the antacid material to be tested is dried to 10-12% water content, the material ground to pass 100 mesh screen and then reduced to a fine powder with a mortar and pestle. A sample weight in grams of exactly 10 times the normality of the standarized hydrochloric acid is used. For example, with 0.1015 N acid, a sample weight of 1.0150 grams would be used. This is done so that the result will represent ml. of 0.1000 N acid/gram without any calculation.

In the test, the accurately weighed sample is placed in a 200 ml. high form beaker and 25.0 ml. of distilled water are added. The pH at zero acid concentration is determined with the Beckmann type "E" glass electrode standarized at pH 9.18 and 10.0. Appropriate quantities of standard acid solution are added to separate samples so that the range from zero concentration of acid to 70 ml. acid/gram is covered with enough points to draw a smooth curve connecting the points. This range is the significant one for showing differences between the action of aluminum antacids. If it is desired to investigate the complete acid consuming power of the antacid, the range should be extended to 300 ml. of acid/gram. The mixture is stirred vigorously for one hour with a mechanical stirrer to give opportunity to reach equilibrium. The pH is determined in this acid range with the standard glass electrode standarized at pH 4.0 and 6.85.

The results of the test for specific acid titration characteristics of dihydroxy aluminum sodium carbonate are illustrated in the graph of the pH versus ml. of 0.100 N hydrochloric acid/gram of sample. Curve 10 is the result of the points so plotted.

*Preparation of the isomer*

The isomer

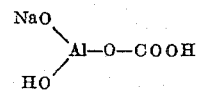

is prepared by the reaction between sodium bicarbonate and sodium aluminate in the presence of an excess of carbon dioxide. The following is a preferred example of the method used.

EXAMPLE II

Sodium bicarbonate (8.4 gms., 0.1 mole) was dissolved in 700 ml. of water and placed in a suitable size carbonation vessel. A copious quantity of carbon dioxide was bubbled through the solution and continued for the duration of the preparation. 200 milliliters of freshly prepared sodium aluminate solution (1.0 mole) were added rapidly from a separatory funnel over a period of ten minutes. The agitation of the entering carbon dioxide was augmented by the use of a high speed turbine-type agitator.

The reaction mixture was tested near the beginning of the reaction, near the middle of the reaction and near the end of the reaction to be absolutely certain that there was a sufficient excess of carbon dioxide. This test consisted of filtering a small sample of the reaction mixture and adding a small amount of 10% magnesium sulfate solution to the filtrate. If there were any cloudiness, it showed that there was sodium carbonate or sodium hydroxide present. Any reaction showing even a suspicion of cloudiness with any of these three tests was discarded immediately.

At the conclusion of the reaction, 500 ml. of isopropyl alcohol was added to the reaction mixture and it was immediately filtered on a large diameter suction filter. This was done in order to remove the water as rapidly as possible consistent with obtaining material of high purity and to hold to a minimum the possibility of hydrolysis of the hydroxy sodoxy aluminum hydrogen carbonate isomer to aluminum hydroxide or some other hydrolytic product. The cake was washed on the filter with two portions of 500 ml. each of isopropyl alcohol. The time from the start of the reaction to the finish of the washing was of the order of one hour.

The resulting filter cake was air-dried at 130° F. in a circulating hot air drier.

The compound produced by the method of Example II is the isomer of dihydroxy aluminum sodium carbonate and has the formula above given. Consequently, it should theoretically have the same analysis as that calculated for dihydroxy aluminum sodium carbonate. For comparison with that analysis as given above, the following analysis was found for a sample of the isomer:

| | |
|---|---|
| $Al_2O_3$ | 34.81%. |
| $CO_2$ | 29.04%. |
| Na | 16.07%. |
| Moisture | 18.2%. |
| pH water suspension | 9.26 |
| Acid consuming power | 221 cc. 0.1 N HCl/gm. |
| Density | 1.90 gms./cc. |

The specific titration curve, determined in the same way as above described, for the isomer, hydroxy sodoxy aluminum hydrogen carbonate, is that indicated in the drawings by the reference numeral 11. As might be expected from the formulae above given for dihydroxy aluminum sodium carbonate and its isomer, the specific titration curves for these two compounds are appreciably different at the beginning of the titration, but as the titration proceeds, the two curves 10 and 11 tend to merge. As has already been pointed out, in the structural formulae of the two compounds, the sodium atom is in a different position. In the case of the isomer, the ONa radical is, as might be assumed, more basic than the hydroxyl radicals and is the first part of the molecule to react with hydrochloric acid. Further, since the sodium atoms are in different positions, it is only logical to assume that there would be some measurable difference in their reaction mechanism, and this is clearly indicated in the initial point of the curves. However, after the reaction of the hydrochloric acid with the sodium has been completed, the compounds resulting from this phase of the reaction are identical, and, as indicated in the latter part of the curves, they show the same response to the remainder of the titration. The following equations serve to illustrate this point:

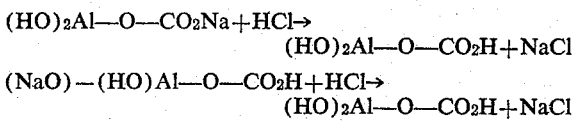

For use as antacids, either of the two compounds, dihydroxy aluminum sodium carbonate or its isomer, is preferably tableted to provide tablets of 5 grains, each. Sugar, starch, dextrin or other binder can be used to facilitate the tableting operation, but no binder is actually required, since the pulverulent compounds readily adapt themselves to tableting processes. These tablets are taken orally by persons having gastric hyperacidity, preferably one or two at a time, and, when necessary to relieve gastric disturbances due to excess acid conditions, successively at intervals of an hour, or so, until relief is obtained.

The antacid materials of my invention can thus be used in combating gastric hyperacidity by orally administering the material to the human host so afflicted. The antacid composition so administered preferably consists essentially of dihydroxy aluminum sodium carbonate or the isomer thereof of the formula herein given. Since these compounds, when made by the methods herein described, are in substantially pure form, free of any substantial proportion of sodium bicarbonate, they provide an antacid that is essentially non-systemic. In view of the advantages, as previously set forth, of non-systemic over systemic antacids, it is preferable not to leave any sodium bicarbonate in the compounds as recovered in accordance with the method procedures herein given, but under some conditions and for some purposes it may be desirable to include a minor proportion of sodium bicarbonate, by weight of the antacid composition.

This is a continuation-in-part of my applications Serial Nos. 342,957 (now forfeited), and 400,822.

I claim as my invention:

1. An essentially non-systemic antacid composition, in dosage unit form for combating gastric hyperacidity, comprising a compound having in its anyhdrous state the generic formula

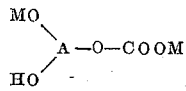

wherein either M is sodium and the other M is hydrogen, the compound of said generic formula that has the specific formula

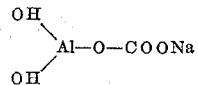

having when possessing a 10 to 12% water content substantially the specific titration curve 10 illustrated in the drawing, and the other compound of said generic formula having specifically the formula

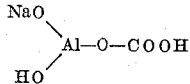

having when possessing a water content of about 18% substantially the specific titration curve 11 illustrated in the drawing; said compounds having said generic formula having a neutralizing capacity towards acid such that when 30 mg. of the compound are added to 20 ml. of 0.01 N-hydrochloric acid at 23° C. the pH value rises to a pH of at least 3 within 5 minutes and shortly thereafter reaches and stays at a pH of about 3.3 for the balance of a 30 minute test period, and said compound having a single aggregate index of refraction between 1.488 and 1.509.

2. The composition defined in claim 1, wherein the dosage unit form is a tablet of about 5 grains.

3. An essentially non-systemic antacid composition, in dosage unit form for combating gastric hyperacidity, comprising hydroxy sodoxy aluminum hydrogen carbonate, having in its anhydrous state the formula

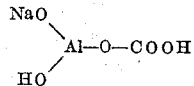

said compound when possessing a water content of about 18% having substantially the specific titration curve 11 illustrated in the drawing, said carbonate having a neutralizing capacity towards acid such that when 30 mg. of the compound are added to 20 ml. of 0.01 N-hydrochloric acid at 23° C. the pH value rises to a pH of at least 3 within five minutes and shortly thereafter reaches and stays at a pH of about 3.3 for the balance of a 30 minute test period.

4. The composition defined in claim 3, wherein the dosage unit form is a tablet of 5 grains.

5. An essentially non-systemic antacid composition, in dosage unit form for combating gastric hyperacidity, comprising dihydroxy aluminum sodium carbonate, having in its anhydrous state the formula

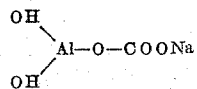

said compound when possessing a 10 to 12% water content having substantially the specific titration curve of curve 10 illustrated in the drawing, said compound having a neutralizing capacity towards acid such that when 30 mg. of the compound are added to 20 ml. of 0.01 N-hydrochloric acid at 23° C. the pH value rises to a pH of at least 3 within five minutes and shortly thereafter reaches and stays at a pH of about 3.3 for the balance of a 30 minute test period, and said compound having a single aggregate index of refraction between 1.488 and 1.509.

6. The composition defined in claim 5, wherein the dosage unit form is a tablet of about 5 grains.

References Cited in the file of this patent
UNITED STATES PATENTS

| | | |
|---|---|---|
| 2,294,889 | Barol | Sept. 8, 1942 |
| 2,446,981 | Ninger | Aug. 10, 1948 |
| 2,570,532 | Eisenberg et al. | Oct. 9, 1951 |

OTHER REFERENCES

Mellor, Inorganic and Theoretical Chem., vol. 5, page 359.

Manuf. Chem. and Manfg. Perfumer, pages 251 and 252, July 1945.

Crohn, Jour. of Laboratory and Clinical Medicine, April 1929, pages 610–614.